May 23, 1950 W. L. MUELLER ET AL 2,508,866
FURNACE FOR BAKING OVENS
Filed April 10, 1945 7 Sheets-Sheet 1

Inventors:
William L. Mueller
Carl J. Rundquist
Carl Richard Skarin
By: Bair & Freeman
Attorneys May 23, 1950 W. L. MUELLER ET AL 2,508,866
FURNACE FOR BAKING OVENS
Filed April 10, 1945 7 Sheets-Sheet 4

Inventors:
William L. Mueller
Carl J. Rundquist
Carl Richard Sharin
By Baird Freeman
Attorneys May 23, 1950 W. L. MUELLER ET AL 2,508,866
FURNACE FOR BAKING OVENS
Filed April 10, 1945 7 Sheets-Sheet 5

Fig.7

Inventors:
William L. Mueller
Carl J. Rundquist
Carl Richard Skarin
By Bair + Freeman
Attorneys May 23, 1950     W. L. MUELLER ET AL     2,508,866
FURNACE FOR BAKING OVENS Filed April 10, 1945     7 Sheets-Sheet 7

Inventors:
William L. Mueller
Carl J. Rundquist
Carl Richard Skarin
By Baird & Freeman
Attorneys Patented May 23, 1950

2,508,866

UNITED STATES PATENT OFFICE 2,508,866

FURNACE FOR BAKING OVENS

William L. Mueller, La Grange, Carl J. Rundquist, Chicago, and Carl Richard Skarin, Western Springs, Ill., assignors to The Petersen Oven Company, a company of Illinois Application April 10, 1945, Serial No. 587,570

6 Claims. (Cl. 263—19)

The present invention relates to furnaces for heating systems of baking ovens or the like, wherein hot gases of combustion are caused to be circulated through ducts or other radiating elements within the baking chamber of the oven. More particularly this invention is directed to improvements in furnaces for oven heating systems of the type wherein the major portion of the combustion gases are recirculated from the ducts or radiating elements of the baking oven to the furnace where they are reheated and admixed with fresh gases of combustion and again directed into the ducts or radiating elements in the baking chamber. There is usually associated with such oven heating systems, a spill damper located in the return duct, adjacent the furnace, to provide communication with the stack so as to permit spilling off into the stack a portion of the combustion gases. The amount of combustion gases permitted to be passed through the stack preferably approximate and balance the fresh combustion gases generated in the operation of the furnace.

The furnace embodying the present invention is especially adapted for highly efficient operation with solid fuel, such as coal, preferably stoker fed, and also lends itself for highly satisfactory operation when using either gaseous or liquid fuels.

Coal fired furnaces constructed for use with baking ovens have not heretofore proved entirely satisfactory for numerous reasons, notwithstanding the possibilities of effecting substantial economies in operation. Due to usual space limitations in bakeries, coal fired furnaces must necessarily be relatively compact in construction, and capable of high thermal output, necessitating relatively high operating temperatures in order to obtain proper and efficient heat control in the baking chamber of the oven. It has been found in the main that coal fired furnaces when operating at relatively high temperatures results in rapid deterioration of or damage to the refractory lining as well as the clean out and inspection doors, and associated metal parts of the furnace.

Various constructional arrangements have heretofore been proposed in conjunction with such coal fired furnaces for effecting a cooling of the refractory lining, when the furnace is operating, by the introduction of outside air. This arrangement results in materially offsetting the thermal output of the furnace for heating the baking chamber, and also results in materially reducing the efficiency of operation of the furnace.

We are aware of a certain furnace construction which is constructed and arranged for recirculation of the returned combustion gases over the top and around a small part of the upper portion of the side wall of the combustion chamber, and wherein the return gases of combustion are caused to be directed into the upper portion of the combustion chamber. This type of furnace is also unsatisfactory for numerous reasons. First the construction is such as to necessitate the use of refractory linings of great thickness and height and weight, necessitating the building of each furnace on the "job" with the attendant relatively high initial cost of construction. Second, furnaces so constructed cannot be practically moved as a unit to a new location such as is frequently necessitated due to changes in arrangement of the operating facilities of the bakery. Third, while a relatively great mass of refractory lining is employed and brought up to a high temperature in the operation of the furnace, the retained heat of the refractory is not efficiently utilized for heating of the baking chamber. Furthermore, due to this relatively great amount of retained heat in the thick refractory lining it is not possible to obtain relatively rapid change over of heating conditions of the baking chamber as is frequently necessary to obtain various ranges of baking temperatures in the process of baking a variety of different types and sizes of food stuffs.

One of the objects of this invention is to provide an improved furnace of the character indicated which permits utilizing a greatly reduced quantity and thickness of refractory lining for the combustion chamber, resulting in a great reduction in weight of the furnace and attendant reduction in cost to manufacture.

Another object is to provide an improved furnace of the character indicated wherein recirculated gases of combustion are directed into contact with substantially the entire outer surface of the refractory wall and thence into the upper portion of the combustion chamber for admixture with freshly generated combustion gases, so as to permit obtaining greatly increased thermal efficiency for heating of the baking chamber while also providing an arrangement for effecting continuous cooling of the refractory lining so as to prolong the life thereof as well as making it possible to effect a relatively rapid change over in thermal output in order to promptly obtain desired heating conditions of the baking chamber for baking various food stuffs.

A further object is to provide an improved furnace of the character indicated wherein recirculated combustion gases from the baking oven are directed into a gas chamber completely surrounding the combustion chamber so that said gases are caused to absorb heat from the refractory lining while at the same time serving to cool said lining.

A still further object is to provide an improved furnace of the character indicated wherein the combustion chamber is completely surrounded by a gas chamber and wherein the combustion chamber is formed with an upright wall of reduced thickness of refractory and a sheet metal dome supported on said wall, and wherein the gas chamber serves to receive the combustion gases returned from the baking oven and said gases are caused to absorb heat from the refractory lining and said dome and are directed through passages in said dome into the upper portion of the combustion chamber for admixture with freshly generated combustion gases for circulation through the heating system.

A still further object is to provide an improved furnace of the character indicated wherein cooled combustion gases from the baking oven are caused to be directed into the combustion chamber in relatively close proximity to the inspection and clean out door of the furnace for protecting the door against excessive heat.

Still another object is to provide a novel stack damper for furnaces of the character indicated for controlling the heat conditions in the system and by virtue of which it is possible to obtain a relatively rapid change over in heating conditions such as for cooling or lowering of the temperature of the baking chamber of the oven.

Still another object of this invention is to provide an improved furnace of the character indicated which is of relatively simple, compact form, inexpensive to manufacture and capable of being prefabricated as a unitary structure for shipment as a unit for installation in association with a baking oven.

Other objects and advantages of this invention will be apparent from the following description taken in connection with the accompanying drawings in which:

Figure 7a is a fragmentary sectional view taken substantially as indicated at line 7a—7a on Figure 7.

Figure 1:
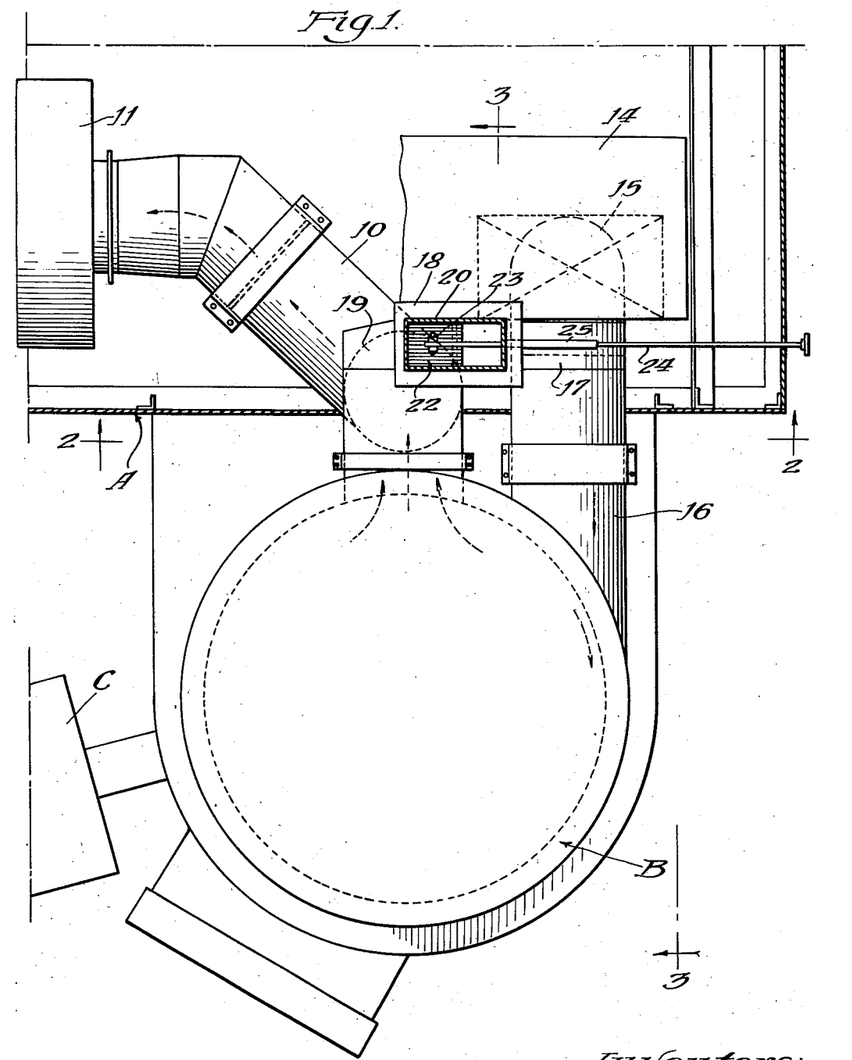
Figure 1 is a schematic top view of the furnace embodying the present invention, shown in operative association with a portion of a baking oven.
Figure 2:
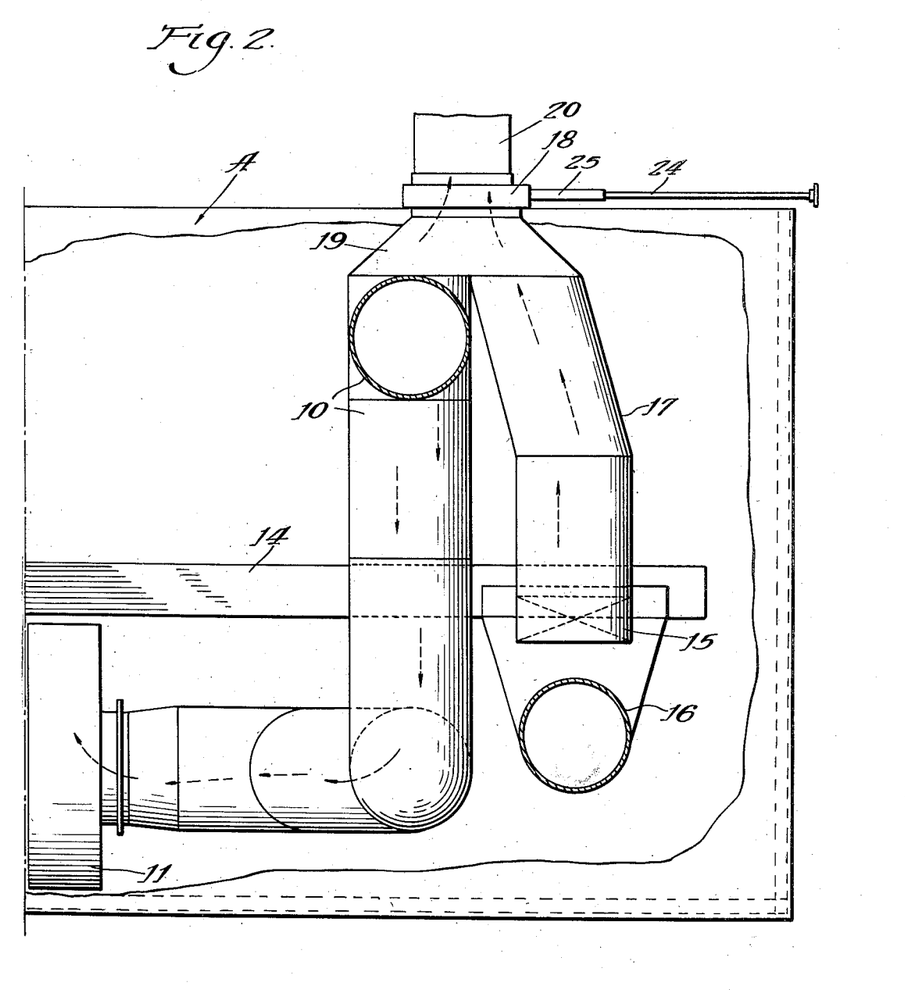
Figure 2 is a schematic elevational view of a portion of the duct system associated with the furnace, taken substantially as indicated at line 2—2 on Figure 1.
Figure 3:
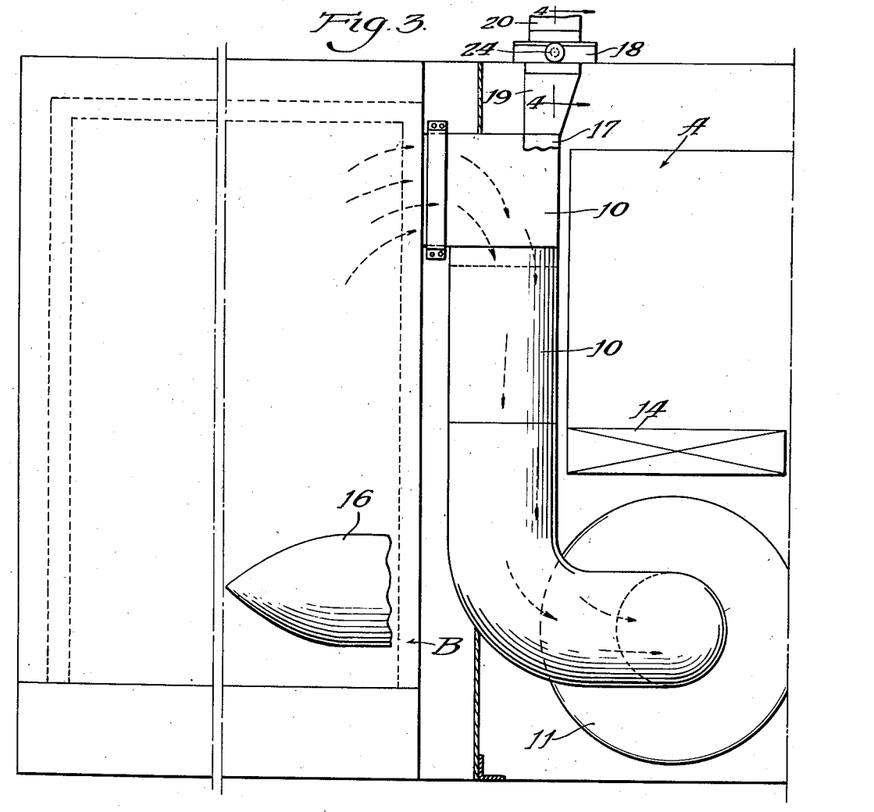
Figure 3 is a vertical schematic view of a portion of the duct system associated with the furnace and the baking oven, taken substantially as indicated at line 3—3 on Figure 1.

Referring to Figures 1 to 3 of the drawings, a portion of a baking oven designated at A, is indicated diagrammatically and which it may be understood has its baking chamber heated by hot combustion gases traveling through suitable heat ducts or radiating elements in a manner well understood in the art. The furnace embodying the present invention, and as indicated generally at B, is shown positioned in close proximity to the oven and a coal fired stoker is indicated generally at C. The furnace is provided with an outlet duct 10 which receives the hot combustion gases from the upper portion of the furnace and directs them to a blower as indicated diagrammatically at 11, for forcibly supplying the hot gases to the ducts or radiating elements in the baking chamber of the oven. The gases as they travel through the ducts or radiating elements in the baking chamber of the oven give up heat and after complete passage through the baking chamber are caused to be redirected back to the furnace through a return duct 14 which communicates with a spill box 15 from which extends horizontally a duct 16 in communication with the bottom portion of the furnace B as will hereafter be more fully described. Extending upwardly from the spill box is a duct 17 which is connected at its upper end in a housing 18 of a stack damper. A by-pass duct 19 also extends upwardly from the upper portion of the supply duct 10 and connects into the housing 18 of the stack damper adjacent said duct 17. Connected to the upper portion of the housing 18 is a stack indicated at 20.

Figure 4:
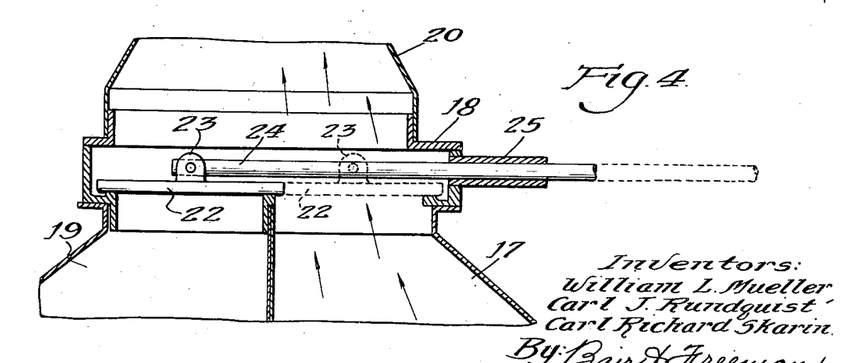
Figure 4 is an enlarged vertical sectional view through a portion of the stack and the associated ducts of the heating system, showing the novel stack damper construction embodying the present invention, taken substantially at line 4—4 on Figure 3.
Figure 5:
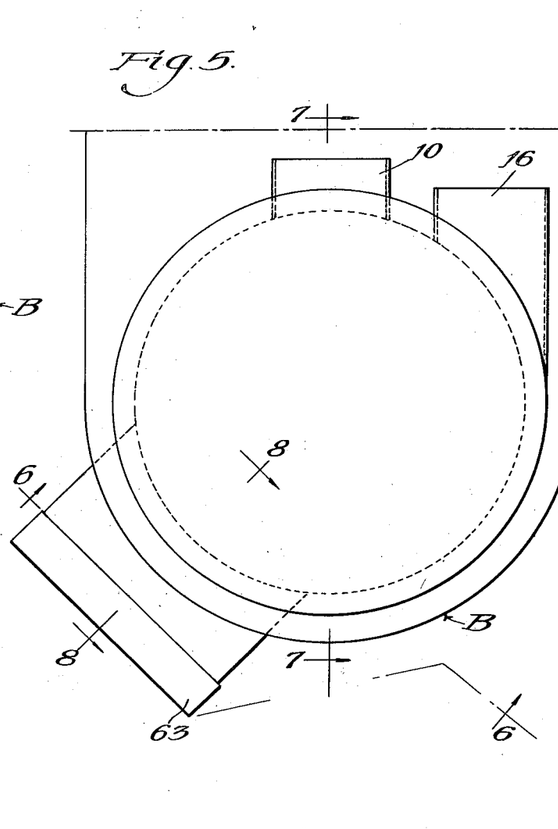
Figure 5 is a diagrammatic top plan view of the furnace embodying the present invention.

Mounted within the stack damper housing 18 is a stack damper plate indicated at 22, and as shown in the full line position in Figure 4, serves to seal off the by-pass duct 19, with respect to communication with the stack 20. This is the position of adjustment of the damper plate when the furnace is operating. When the furnace is to be shut down the stoker C is adjusted to "hold fire" control and the blower 11 is permitted to operate until the main duct temperature is reduced to a safe condition, after which the stack damper plate 22 is moved from the full line position to the dotted line position, as seen in Figure 4, at which the by-pass duct 19 is in direct communication with the stack 20, and the spill duct 17 is sealed or closed from communication with said stack 20. When the damper plate is in the dotted position, the hot combustion gases produced in the combustion chamber of the furnace are vented directly to the stack. By virtue of this condition, hot gases are no longer supplied to the radiating ducts in the baking chamber and thereby a rapid cooling of said chamber is effected.

The upper surface of the damper plate is provided with a pair of upstanding lugs 23 between which is pivotally connected the inner end of a horizontally extending operating rod 24, projecting through the housing 18, and supported and guided in a sleeve 25, associated with said housing 18. By virtue of the damper construction represented in Figure 4 it is possible by the operation of a single control rod 24 to effect proper control of the supply of hot gases to the ducts of the baking chamber, as well as the venting of the spill gases to the stack. If desired it may be understood that there may be associated with the operating rod 24 suitable connections to control switches for controlling the operation of the coal fired stoker C and/or the blower 11.

The novel furnace construction embodying the present invention is provided with a combustion chamber indicated at 30, comprising an upright refractory lining 31 of reduced thickness. Surrounding the refractory lining is a sheet metal jacket 33, the upper end of which terminates slightly above the upper marginal edge of the refractory lining 31. The upper part of the combustion chamber is in the form of a sheet metal dome 35 supported in spaced relation to and immediately above the refractory wall. A plurality of pairs of circumferentially spaced apart clips 36 are attached to the upper marginal portion of jacket 33 and the lower marginal portion of the dome 35, and said clips are interconnected by screws 38 with spacers 39 interposed between the clips as clearly seen in the drawings, so that the lower marginal edge of the dome 35 is supported in spaced-apart relation to the top of the refractory wall, forming a passageway 40 between said dome and refractory wall, entirely around the combustion chamber. The top of the dome and the upper portion of the side wall thereof are formed with a plurality of openings 42. The purpose of the passageway 40 and the openings 42 is to provide for the free entry of the returned combustion gases into the upper portion of the combustion chamber for reheating and recirculation through the system as will be presently described. To further insure adequate flow of the returned combustion gases for entry into the combustion chamber the lower marginal edge of the dome is provided with a plurality of circumferentially spaced-apart outwardly bent tangs as indicated at 44, as may be clearly seen in Figure 7a of the drawings, so as to provide additional passageways 45 through which the returned combustion gases may enter the combustion chamber.

Figure 7:
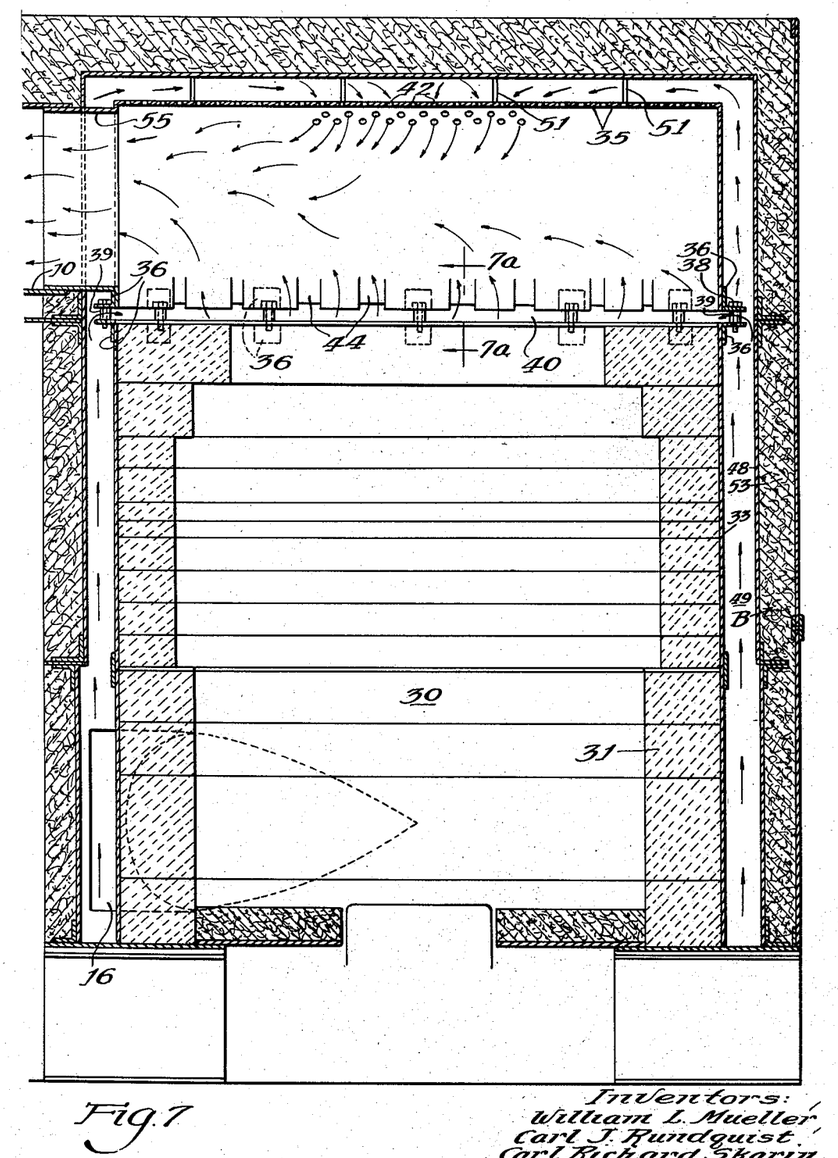
Figure 7 is a vertical sectional view through the furnace, taken substantially as indicated at line 7—7 on Figure 5.
Figures 9, 11:
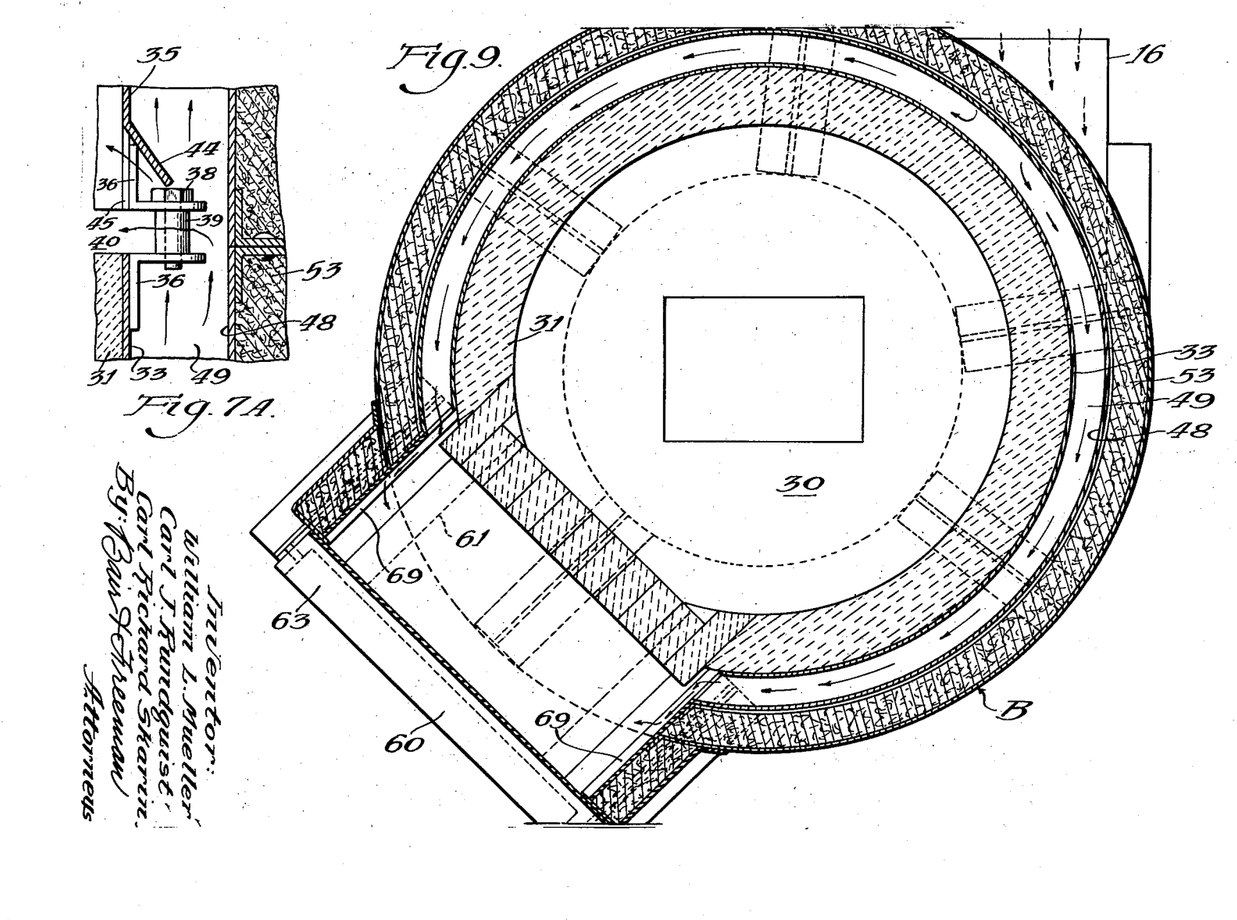
Figure 9 is a horizontal sectional view through the furnace, taken immediately above the inspection and clean out door at a plane as indicated at line 9—9 on Figure 8.
Figure 11 is a horizontal, fragmentary sectional view through a portion of the furnace wall and the inspection and clean out door, taken substantially as indicated at line 11—11 on Figure 8.

Surrounding the combustion chamber 30, in spaced apart relation thereto as may be clearly seen in Figures 7 and 9 of the drawings, is a sheet metal housing 48, thereby forming a gas chamber 49 completely surrounding the refractory wall and the dome of the combustion chamber. The upper surface of the dome of the combustion chamber is rigidly connected in spaced apart relation to the top wall of the housing 48 by a plurality of spacer bars or rods 50, preferably welded at opposite ends to the adjacent surfaces of the dome and sheet metal housing 48. Surrounding the housing 48 is a jacket 53, of insulating material, such as rock wool.

The dome 35 of the combustion chamber is formed with a laterally extending duct extension 55 which is adapted to be fitted into the upper end of the supply duct 10 of the heating system. The return duct 16 connects into the side wall of the furnace, in open communication with the gas chamber 49, at the lower end thereof as clearly seen in Figures 2 and 7 of the drawings.

It will now be manifest that the heat generated within the combustion chamber 30, in the form of hot combustion gases, travels upwardly into the dome portion thereof, and thence into the supply duct 10, and then with the assistance of the blower 11, said hot gases are forcibly fed into the heat ducts or radiating elements in the baking chamber of the oven. As the combustion gases give up their heat while traveling through the ducts or radiating elements of the baking chamber, said gases are redirected and returned to the furnace through the return ducts 14 and 16, and said gases are caused to enter the gas chamber 49, at the bottom thereof, and travel around the refractory wall, and partially around and over the dome of the combustion chamber and enter the upper portion of the combustion chamber through the passageway 40, the apertures 42 in the top of the dome and the vent openings 45. Said gases as they travel through the gas chamber are caused to absorb a substantial amount of heat from the refractory wall and dome so that when said gases enter the combustion chamber and become admixed with the freshly generated combustion gases, the admixture will then be circulated through the heating system of the baking oven.

By virtue of the substantial heat absorption by the recirculated gases as they pass through the gas chamber, said gases as they enter the combustion chamber will not in any way disturb the efficiency of combustion of the furnace because said gases are sufficiently heated so as not to effect chilling of the flame in the fire box. Due to this construction substantially the entire outer surface of the combustion chamber, including the refractory wall and dome, gives up heat to the recirculated gases returning from the oven and thus said refractory wall is continuously cooled so that it is now possible for the first time to greatly reduce the thickness of the refractory lining while obtaining maximum thermal efficiency of the furnace, and at the same time greatly prolonging the life of the refractory lining. By the expression "reduced thickness" as used herein in relation to the refractory wall we mean that on an average the thickness of the refractory wall has been reduced approximately 40 to 50 percent as compared to refractory walls heretofore employed in furnaces of the general type embodying the present invention. It will be apparent that the recirculated gases are constantly being forced through the heating system of the baking oven and returned to the furnace for reheating and continued recirculation in the system, and the amount of the returned or recirculated gases which are by-passed through the spill damper for discharge through the stack preferably is just sufficient to balance the primary combustion in the furnace—in other words, sufficient to accommodate the volumetric increase of gas in the system necessary to support proper combustion in the combustion chamber.

By virtue of the reduced thickness of refractory wall and the continuous and rapid absorption of heat from the refractory by the recirculated gases, it is possible to rapidly effect a change over in heating conditions of the baking chamber, such as lowering of the temperature for the baking of various types and sizes of food stuffs. Such change over may be rapidly effected by merely adjusting the temperature indicating control on the baking oven.

By virtue of the construction above described, it is possible to produce our novel furnace construction as a prefabricated, unitary structure for shipment as a complete assembly for installation in a bakery. Thus great economies are effected in manufacture by virtue of prefabrication and by virtue of the greatly reduced amount of weight of the refractory lining.

Figure 6:
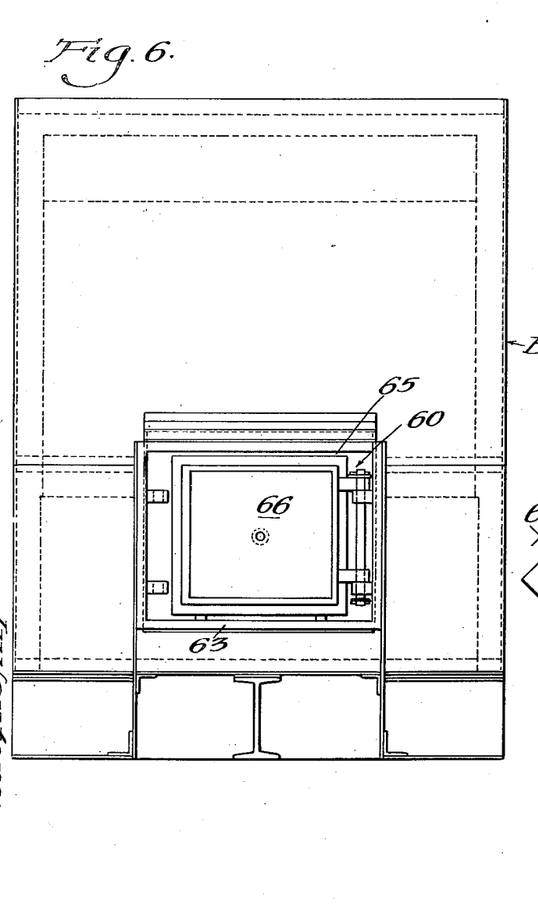
Figure 6 is a front elevational view of the furnace, taken substantially as indicated at line 6—6 on Figure 5.

Furnaces of the general type embodying the present invention are provided with inspection and clean out doors as indicated at 60 in Figure 6 of the drawings. It is well known that due to the excessively high temperature necessary in operating coal fired furnaces of the type for heating of baking ovens, such doors and other associated metal parts are usually subject to rapid deterioration. Moreover in prior furnaces of this class it has not been found convenient or practical to make an inspection of the interior of the furnace during the time of operation thereof due to the excessive heat of the furnace.

Figure 8:
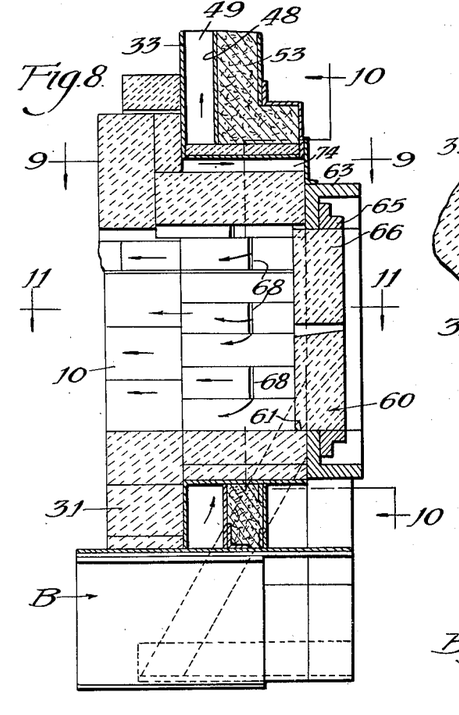
Figure 8 is an enlarged vertical section through the inspection and clean out door of the furnace, taken substantially as indicated at line 8—8 on Figure 5.
Figure 10:
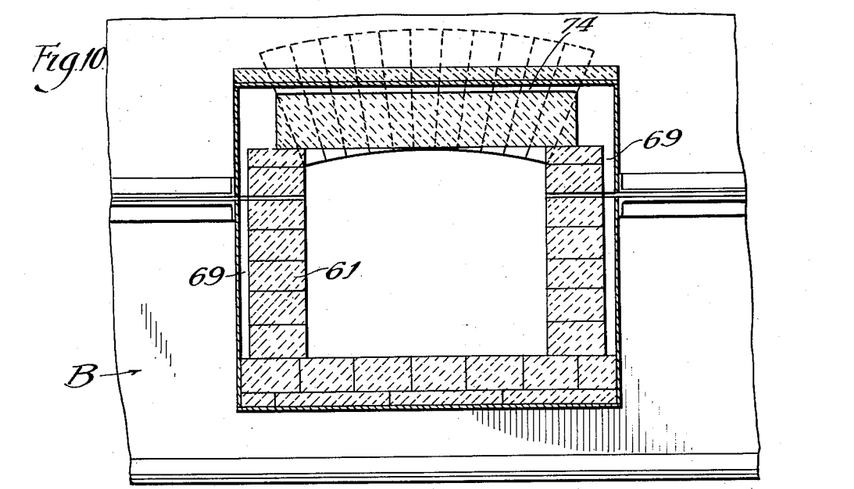
Figure 10 is a view, part in elevation and part in section, through the inspection and clean out door, taken substantially as indicated at line 10—10 on Figure 8.
Figure 11:
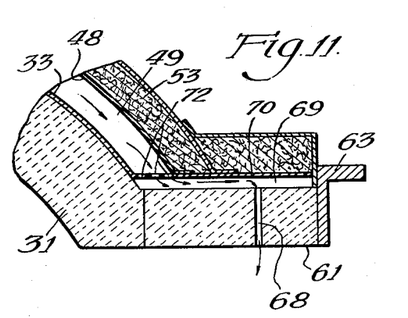

In the furnace embodying the present invention, we employ a novel construction by virtue of which the door 60 is continuously cooled during operation of the furnace. The door opening as indicated at 61, and as may be seen in Figures 8 and 10, is lined with refractory brick, and is of generally rectangular form. Mounted in surrounding relation to said opening is a conventional metal door frame 63 to which is hingedly connected a door 65, carrying a refractory panel 66, registering with and of a size corresponding to said opening 61, as clearly seen in Figure 8. The side walls of the opening have certain of the refractory brick spaced apart to form a plurality of relatively narrow passageways 68, which are in open communication with vertical ducts 69 formed of sheet metal plate 70 and located at each side of the door opening. Said plates 70 are each provided with a plurality of apertures 72, in registration with the annular gas chamber 49, so that a portion of the recirculated gases as they are returned to the gas chamber of the furnace are caused to flow through the openings 72 into the ducts 69, and through the passageways 68, into the area of the door opening, immediately adjacent the door 65, so as to effect a continuous cooling of the gases adjacent said door. The path of travel of the gases from the gas chamber 49 into the area of the door opening is clearly indicated by the arrows in Figures 8 and 11 of the drawings. By virtue of the continuous flow of comparatively cool returned combustion gases in close proximity to the inspection and clean out door, the temperature at the door is maintained comparatively low, thus greatly increasing the life of the door, and associated metal parts, and making it possible for convenient inspection of the interior of the combustion chamber when the furnace is in operation. As may be clearly seen in Figure 10, the refractory lining surrounding the door opening 61 is arranged so as to provide a horizontally extending duct 74, above said opening, communicating with the vertically extending ducts 69 at the sides of the opening, and serving to further assist in cooling the refractory lining immediately adjacent the door opening.

Thus by the furnace structure embodying the present invention it is now possible to efficiently heat the baking chamber of an oven by the hot gases from a solid fuel fired furnace, and wherein the furnace may be quickly controlled so as to obtain a desired range of thermal output, comparable to that when using gas or fluid fuel. While we have herein shown the furnace in close association to the baking oven, it will be manifest that it could, if desired, be located remotely therefrom, such as in another room or on another floor, while still serving to provide efficient heating of the baking chamber of the oven.

Although we have herein shown and described certain preferred embodiments of our invention, manifestly it is capable of modification and rearrangement of parts without departing from the spirit and scope thereof. We do not, therefore, wish to be understood as limiting this invention to the precise embodiment therein disclosed, except as we may be so limited by the appended claims.

We claim as our invention:

1. A furnace for heating baking ovens or the like by circulating hot combustion gases, comprising, upright refractory walls bounding a combustion chamber open at its upper end, a sheet metal dome mounted on the upper end of said refractory walls and above the open end of said combustion chamber, said dome having a top wall and a surrounding side wall, said dome substantially bounding a mixing chamber, the lower edge of said dome being spaced from the upper edge of said upright refractory walls, duct means leading from said dome to the oven, a housing surrounding said upright refractory walls and said dome in spaced relation therewith forming a gas passageway around said upright refractory wall and around and over said dome, return duct means leading from said oven through said housing to communicate with the lower end of said gas passageway, and the lower edge of said dome having portions cut and bent so that a plurality of tangs are formed which protrude into the gas passageway so as to direct the ambient gases in the passageway into the chamber bounded by said dome.

2. A furnace for heating baking ovens or the like by circulating hot combustion gases, comprising, upright refractory walls bounding a combustion chamber open at its upper end, a sheet metal dome mounted on the upper end of said refractory walls and above the open end of said combustion chamber, said dome having a top wall and surrounding side wall and substantially bounding a mixing chamber, the lower edge of said dome being spaced from the upper edge of said upright refractory walls, duct means leading from said dome to the oven, a housing surrounding said upright refractory walls and said dome in spaced relation therewith forming a gas passageway around said upright refractory wall and around and over said dome, return duct means leading from said oven through said housing to communicate with the lower end of said gas passageway, and the lower edge of said dome and the upper edge of said refractory walls defining a passageway communicating between said gas passageway and said mixing chamber.

3. A furnace for heating baking ovens or the like by circulating hot combustion gases, comprising, upright refractory walls bounding a combustion chamber open at its upper end, a sheet metal dome mounted on the upper end of said refractory walls and above the open end of said combustion chamber, said dome having a top wall and surrounding side wall and substantially bounding a mixing chamber, the lower edge of said dome being spaced from the upper edge of said upright refractory walls, duct means leading from said dome to the oven, a housing surrounding said upright refractory walls and said dome in spaced relation therewith forming a gas passageway around said upright refractory wall and around and over said dome, return duct means leading from said oven through said housing to communicate with the lower end of said gas passageway, the lower edge of said dome and the upper edge of said refractory walls defining a passageway communicating between said gas passageway and said mixing chamber, and portions of said dome being cut and bent to form a plurality of tangs which protrude into the gas passageway so as to direct the ambient gases in that passageway into the mixing chamber bounded by said dome.

4. A furnace for heating baking ovens or the like by circulating hot combustion gases, comprising, upright refractory walls bounding a combustion chamber open at its upper end, a sheet metal dome mounted on the upper end of said refractory walls and above the open end of said combustion chamber, said dome having a top wall and surrounding side wall and substantially bounding a mixing chamber, the lower edge of said dome being spaced from the upper edge of said upright refractory walls, duct means leading from said dome to the oven, a housing surrounding said upright refractory walls and said dome in spaced relation forming a gas passageway around said upright refractory wall and around and over said dome, return duct means leading from said oven through said housing to communicate with the lower end of said gas passageway, the lower edge of said dome and the upper edge of said refractory walls defining a passageway communicating between said gas passageway and said mixing chamber, and the walls of said dome being perforated to provide a plurality of entrances for the ambient gas in the gas passageway into the mixing chamber bounded by said dome.

5. In a furnace for heating baking ovens or the like having a combustion chamber, a mixing chamber above the combustion chamber, a supply duct leading hot gases from the mixing chamber to the oven and a return duct for directing the cooled gases back to the mixing chamber for reheating and recirculation, a device for controlling the temperature of the mixture of recirculating gases comprising, a stack, a by-pass duct connecting the supply duct and stack, a spill duct connecting the return duct and the stack, said by-pass duct and spill duct joining the stack at adjacent positions, means comprising a slidable damper plate within the stack, said damper plate registering with the two adjacent ducts at their juncture points to the stack, and means for actuating said damper plate to progressively regulate the two ducts joining the stack by simultaneously closing off one duct and opening the other, and vice versa.

6. In a furnace for heating baking ovens or the like having a combustion chamber, a mixing chamber above the combustion chamber, a supply duct leading hot gases from the mixing chamber to the oven and a return duct for directing the cooled gases back to the mixing chamber for reheating and recirculation, a device for controlling the temperature of the mixture of recirculating gases comprising a stack, a by-pass duct connecting the supply duct and stack, a spill duct connecting the return duct and the stack, said by-pass duct and spill duct joining the stack at adjacent positions, means comprising a slidable damper plate within the stack, said damper plate registering with the two adjacent ducts at their juncture points to the stack, the two ducts at their juncture points to the stack being of the same cross-sectional size, said damper plate being of the same size as each duct so that it completely seals one duct when the other is wholly open, and means for actuating said damper plate to progressively regulate the two ducts joining the stack by simultaneously closing off one duct and opening the other, and vice versa.

WILLIAM L. MUELLER.
CARL J. RUNDQUIST.
CARL RICHARD SKARIN.

REFERENCES CITED

The following references are of record in the file of this patent:

UNITED STATES PATENTS

| Number | Name | Date |
|---|---|---|
| 1,301,324 | Schlatter | Apr. 22, 1919 |
| 1,431,146 | Bolling | Oct. 10, 1922 |
| 1,629,921 | Mansfield | May 24, 1927 |
| 1,841,533 | Hopkins et al. | Jan. 19, 1932 |
| 1,857,447 | Engels | May 10, 1832 |
| 1,967,883 | Hofmann | July 24, 1934 |
| 2,113,426 | Engels | Apr. 5, 1938 |
| 2,137,682 | Fisher | Nov. 22, 1938 |
| 2,160,633 | Young | May 30, 1939 |
| 2,164,954 | Stephens | July 4, 1939 |
| 2,231,445 | Grapp | Feb. 11, 1941 |